United States Patent
Pettersson et al.

(10) Patent No.: US 9,683,828 B2
(45) Date of Patent: Jun. 20, 2017

(54) MEASURING MACHINE AND METHOD FOR AUTOMATED MEASUREMENT OF AN OBJECT

(71) Applicant: HEXAGON TECHNOLOGY CENTER GMBH, Heerbrugg (CH)

(72) Inventors: Bo Pettersson, Luxembourg (LU); Knut Siercks, Mörschwil (CH); Benedikt Zebhauser, Rorschach (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 153 days.

(21) Appl. No.: 14/646,365

(22) PCT Filed: Nov. 20, 2013

(86) PCT No.: PCT/EP2013/074267
§ 371 (c)(1),
(2) Date: May 20, 2015

(87) PCT Pub. No.: WO2014/079871
PCT Pub. Date: May 30, 2014

(65) Prior Publication Data
US 2015/0300798 A1    Oct. 22, 2015

(30) Foreign Application Priority Data
Nov. 21, 2012 (EP) .................... 12193541

(51) Int. Cl.
G01B 5/008 (2006.01)
G01B 21/04 (2006.01)
G05B 19/401 (2006.01)

(52) U.S. Cl.
CPC ............ G01B 5/008 (2013.01); G01B 21/04 (2013.01); G05B 19/401 (2013.01);
(Continued)

(58) Field of Classification Search
CPC ...................................................... G01B 5/008
(Continued)

(56) References Cited

U.S. PATENT DOCUMENTS 5,465,221 A    11/1995    Merat et al.
7,865,330 B2   1/2011     Chang et al.
(Continued)

FOREIGN PATENT DOCUMENTS

CN    1436648 A      8/2003
CN    101581579 A    11/2009
(Continued)

OTHER PUBLICATIONS

European Search Report dated Mar. 26, 2013 as received in Application No. 12 19 3541.

*Primary Examiner* — G. Bradley Bennett
(74) *Attorney, Agent, or Firm* — Maschoff Brennan (57) ABSTRACT

The invention relates to a measuring machine and a method for automated measurement of an object and detection of differences between a feature of the object and CAD data of the object. The measuring machine comprises a probe head, a probe system comprising a probe and measurement functionality for determining three-dimensional coordinates of a feature of the object, a local computer terminal, an assigned memory unit, and an assigned set of measurement software programs for controlling the measuring machine. The stored CAD data of the object comprise typical dimensions and tolerances of the features, and the assigned set of measurement software programs comprises an optimization algorithm for the measurement of each feature which algorithm is designed to automatically select measuring parameters of the measuring machine and/or a measurement software program from the set of measurement software programs.

17 Claims, 4 Drawing Sheets

(52) U.S. Cl.
CPC .............. *G05B 2219/37193* (2013.01); *G05B 2219/37443* (2013.01); *Y02P 90/265* (2015.11)

(58) Field of Classification Search
USPC .......................... 33/503, 556–558, 559–561
See application file for complete search history.

(56) References Cited

U.S. PATENT DOCUMENTS

| | | |
|---|---|---|
| 8,706,281 B2 | 4/2014 | Lettenbauer et al. |
| 2005/0171733 A1 | 8/2005 | Hough |
| 2008/0236260 A1* | 10/2008 | Noda .................... G01B 5/008 73/105 |
| 2009/0289953 A1 | 11/2009 | Chang et al. |
| 2011/0178765 A1 | 7/2011 | Atwell et al. |
| 2011/0184695 A1 | 7/2011 | Grzesiak |
| 2012/0084989 A1* | 4/2012 | Pettersson ............ G01B 21/045 33/503 |
| 2014/0007441 A1* | 1/2014 | Pettersson ............ G01B 21/045 33/503 |
| 2014/0059872 A1* | 3/2014 | Nakagawa ........... G01B 21/045 33/502 |
| 2014/0130362 A1* | 5/2014 | Ishikawa .............. G01B 21/045 33/503 |
| 2015/0211847 A1* | 7/2015 | Abe ....................... G01B 5/008 33/503 |
| 2015/0285616 A1* | 10/2015 | Jordil .................. G01B 21/047 348/135 |
| 2016/0040987 A1* | 2/2016 | Bernhardt ............. G01B 21/04 33/503 |
| 2016/0341533 A1* | 11/2016 | Noda ..................... G01B 5/008 |
| 2016/0364869 A1* | 12/2016 | Siercks ................ G06T 7/0044 |

FOREIGN PATENT DOCUMENTS

| | | |
|---|---|---|
| CN | 101587504 A | 11/2009 |
| CN | 101758377 A | 6/2010 |
| CN | 102105908 A | 6/2011 |
| CN | 102197274 A | 9/2011 |
| CN | 102656422 A | 9/2012 |
| DE | 101 30 737 A1 | 1/2003 |
| DE | 10 2010 014 423 A1 | 10/2011 |
| EP | 1 330 686 B1 | 12/2006 |
| JP | 9 178 469 A | 1/1999 |
| WO | 02/23292 A2 | 3/2002 |

\* cited by examiner

MEASURING MACHINE AND METHOD FOR AUTOMATED MEASUREMENT OF AN OBJECT

FIELD OF THE INVENTION

The present invention relates to a measuring machine, particularly a coordinate measuring machine (CMM), and a method for automated measurement of an object and detection of differences between a feature of the object and computer-aided design (CAD) data of the object, the CAD data being stored in a data base. Particularly, the measuring machine comprises a probe head supported for movement along three mutually perpendicular axes, a probe system comprising a probe to be connected with the probe head, and measurement functionality for determining three-dimensional coordinates of a feature of the object. The measuring machine further comprises a local computer terminal that is connected to or part of the measuring machine, an assigned memory unit for storing the data base comprising the CAD data, and an assigned set of measurement software programmes for controlling the measuring machine.

BACKGROUND

Subsequent to the production of a workpiece it is common practice in quality assurance to inspect the workpiece on a measuring machine, such as a coordinate measuring machine, having a movable probe head.

In a conventional three-dimensional measuring machine, the probe head is supported for movement along three mutually perpendicular axes (in directions X, Y and Z). The probe head comprises a suitable transducer as a probe, for example for tactile or optical measurements, which is used to determine the position of the probe head relative to a base of the machine and to determine the coordinates of a measurement point on an object being approached by the probe.

The functionality of a conventional coordinate measuring machine is typically structured as follows:

The measuring machine is designed to satisfy certain performance requirements, such as size, measurement accuracy and speed. The machine dynamics is designed for allowing satisfaction of such requirements. A machine controller is provided for running the machine according to the required performance parameters, including machine calibration for meeting an overall set of machine specifications. Typically, a conventional coordinate measuring machine is provided with a system software package comprising a basic software package and one or more additional feature software packages accomplishing the basic package.

A conventional process for measuring an object with a measuring machine is structured as follows:

It is presupposed that CAD data of the object to be measured are available for preparation of the measurement. If this condition is satisfied, features of the object to be measured are selected. This regularly first implies choice of the way how the selected features shall be measured, and selection of a suitable probe system. If there is a need for a datum then a way for realization of the datum is selected. Finally in the preparation phase, a part programme is selected, which may imply different degrees of automation, ranging from completely manual to fully automated generation of the part programme.

After accomplishment of the preparation phase, the execution phase of a conventional measurement process comprises the following steps:

Depending on required measurement accuracy and further required measurement and performance parameters, in the beginning a suitable measuring machine is selected. Then typically the object to be measured is loaded into the measuring machine, accompanied by the steps of calibrating the selected probe system, setting up measuring machine parameters, particularly also a targeted measurement accuracy and speed. The last steps of the execution phase comprise executing the measurement part programme and, finally, determining deviations between the CAD data and the measurement data of the real part.

The preparation of a measuring machine for performing a measurement of an object takes a significant amount of time and efforts. Furthermore, precise measurements of features of objects of any kind require a variety of dedicated measurement tools or parts and availability of a large number of different measurement programmes.

DE 101 30 737 B4 discloses a system wherein a number of stations are used to measure and adjust cutting tools used on computer numerical control (CNC) machines. The units have measuring systems, controlled axes and are linked to local controllers that use local and remote software. The remote software is provided by a link over the internet to a central computer. The invention of DE 101 30 737 B4 is dedicated to solve the object of providing an adjustment device capable of performing a plurality of different measurement tasks in a flexible way and at low costs. For this purpose, according to DE 101 30 737 B4, a part of the system software is not resident on a local computer for device control, but on an external, central computer, thus reducing the requirements on the local control system. A user may be provided with remote software packages for measuring machines via the internet either for sale or for rent, or on any other basis, just only for the time when such "additional intelligence" is needed, this software being saved on and available from an external server.

Thus, system requirements to be realized on a user's site are reduced, but a support for improving the efficiency of working with the measuring machine, particularly in the course of steps for preparation of a measurement, is not provided.

JP 9 178 469 discloses a roundness measuring machine provided with an automatic part programme selection, wherein the part programme, in which a measurement procedure for a work piece is incorporated, is selected after a preceding measurement for a discrimination of a work piece fixing jig, e.g. in the form of a hole for identification purposes. In this way, risks of a damage of the measurement tool or part provoked by the potential of a wrong choice of the measurement tool or part are reduced. In a disclosed example, the part programme is selected depending on the size and the position, in an X-Y direction, of the hole as a jig discriminating formation part. However, also the invention of JP 9 178 469 does not provide further support for the steps of preparation of a measurement.

SUMMARY

Some embodiments of the present invention provide a control system that improves the performance of a measuring machine, in particular to improve the efficiency of working with a measuring machine and to reduce the work load for measurement preparation.

The measuring machine comprises a probe head, a probe system comprising a probe to be connected with the probe head and measurement functionality for determining three-dimensional coordinates of a feature of the object. The measuring machine further comprises a local computer terminal that is connected to or part of the measuring machine, an assigned memory unit for storing the data base comprising the CAD data, and an assigned set of measurement software programmes for controlling the measuring machine. The stored CAD data of the object comprise typical dimensions and tolerances of the features of the object. The assigned set of measurement software programmes for controlling the measuring machine comprises an optimization algorithm for the measurement of each feature, the optimization algorithm being designed to automatically select, particularly dependent on the stored typical dimensions and tolerances of the features to be measured, measuring parameters of the measuring machine, and/or a measurement software programme from the set of measurement software programmes.

Advantageously, the measurement preparation is thus largely facilitated for a user or operator. After selection of object features to be measured, the user does not need to spend further time and effort for finding the best way how to perform the measurement, because all necessary steps for measurement preparation are performed automatically.

In a preferred embodiment the probe head is supported for movement along three mutually perpendicular axes, the measuring machine particularly being a portal type coordinate measuring machine. In another embodiment the probe head is supported for movement around a rotational axis, the measuring machine particularly being an articulated arm type coordinate measuring machine. In a further embodiment the probe head is supported by a parallel kinematics structure of the measuring machine.

In one embodiment the measuring machine comprises at least one camera for localization of the object to be measured and/or of features of the object. In particular, the camera can also be used for automatically identifying the object.

In another embodiment the measuring machine comprises at least one camera for localization of the probe head.

According to a preferred embodiment of the invention, the local computer terminal is connected with the internet, particularly by a modem. Thus, data and software items for measuring machine operation and measurement preparation and execution need not all be resident on the local computer, but can also be accessed via the internet.

According to one embodiment, the assigned memory unit is installed at least partially at the site of the local computer terminal. Thus, the assigned memory unit is accessible also in case of an interruption or breakdown of the internet connection.

According to another embodiment, the assigned memory unit is installed at least partially on a central computer of a network and/or an internet server and accessible over a local network connection and/or an internet connection, respectively. This reduces the requirements on the local data storage capacities and simultaneously enables access to a data base content that can easily be actualized with a high up-date frequency.

According to one embodiment, the assigned set of measurement software programmes for controlling the measuring machine is installed at least partially at the site of the local computer terminal. This allows for locally operated control of the measuring machine and measurement execution.

According to another embodiment, the assigned set of measurement software programmes for controlling the measuring machine is installed at least partially on a central computer of a network and/or an internet server and accessible over a local network connection and/or an internet connection, respectively. This reduces the requirements on the local programme storage capacities, particularly in cases where large numbers of different measurement programmes for different kinds of measurements are needed, and simultaneously enables access to measurement programmes that can easily be actualized with a high up-date frequency.

Also virtual servers or cloud computing can be used. In one embodiment the data and software items are stored in a public or private cloud.

According to a further embodiment of the invention, as an additional option, the system software for the measuring machine additionally comprises a further set of features to be presented, effected by the optimization algorithm, to an operator after selection, by the operator, of a feature of the object to be measured. This further set may comprise
needed feature software packages,
possible accuracy levels,
an input option for the operator for selection of a requested accuracy level, and
an input option for the operator for selection of a feature software package.

The above list of optional features may be supplemented by further items. For example, additionally an estimated time for measuring with certain measurement accuracies and/or an estimated accuracy when measuring for a certain time may be presented to an operator. Furthermore, a price for buying or renting a certain software programme or a software package may be monitored.

This provides the operator with more flexibility for the choice of the definitive way how a measurement is executed, wherein, however, he is supported by the proposals provided by means of the optimization algorithm.

A further subject of the invention is a method for automated measurement of an object with a measuring machine, particularly a coordinate measuring machine as described above, and automated detection of deviations between a feature of the object and CAD data of the object, the CAD data being stored in a data base.

The method comprises the steps of selecting, by the operator, a feature of the object to be measured by the measuring machine, selecting a probe system and measurement parameters of the measuring machine, measuring the feature of the object, detecting deviations between the feature and the CAD data, and presenting deviations between the feature and the CAD data.

According to the invention, the stored CAD data of the object comprise typical dimensions and tolerances of the features of the object, and, in the step of selecting a probe system and measurement parameters of the measuring machine, an optimization algorithm for the measurement of each feature automatically selects, particularly dependent on the stored typical dimensions and tolerances of the features of the object to be measured, measuring parameters of the measuring machine, and/or a measurement software programme from a set of measurement software programmes.

Thereby, the automatic selection of the measurement software programme is subject to parameters of the measuring machine, particularly its size, attributes of the feature to be measured, and/or operator-selected parameters, in particular an accuracy or tolerance level, and/or a throughput or speed level of measurement to be executed.

Preferably, the method is designed to enable measuring features having different sizes and tolerances. Thus, the method provides a large measurement flexibility to an operator or user.

It is further preferred that the set of measurement software programmes comprises measurement software programmes for measuring features of different sizes and tolerances, which are automatically selected and executed in the course of performing a measurement.

As an example concerning a certain measurement task, this means that for measuring an object (e.g. an engine block), a first feature (e.g. four cylinders) is measured with a machine/measurement accuracy "A" and measuring speed "B", a second feature (e.g. twenty cooling outlets) with an accuracy "C" and speed "D", and a third feature (e.g. eight thread holes) with an accuracy "E" and speed "F". Thereby, the system is preferably capable to switch automatically between different measurement modes, particularly concerning accuracy and measurement speed.

Thus, the user comfort for measuring machine operation and measurement execution is enhanced, as the user does not need to spend time and effort for selecting machine parameters and programme options dependent on feature sizes and tolerances.

Preferably, the local computer terminal is connected with the internet, particularly by a modem.

According to one embodiment of the inventive method, the assigned memory unit is installed at least partially at the site of the local computer terminal.

According to another embodiment, the assigned memory unit is installed at least partially on a central computer of a network, on an internet server and/or in a cloud and accessed over a local network connection and/or an internet connection, respectively.

According to one embodiment, the assigned set of measurement software programmes for controlling the measuring machine is installed at least partially at the site of the local computer terminal, and the method is executed at least partially on the local computer.

According to another embodiment, the assigned set of measurement software programmes for controlling the measuring machine is installed at least partially on a central computer of a network, on an internet server and/or in a cloud and accessed over a local network connection and/or an internet connection, respectively, and the method is executed at least partially in connection with the network and/or internet server.

According to a further embodiment of the inventive method, after selection, by the operator, of a feature of the object to be measured, effected by the optimization algorithm a set of features is presented to the operator, comprising at least one of needed feature software packages and possible accuracy levels.

The above list of optional feature items to be displayed may be supplemented by further items.

For example, additionally an estimated time for measuring with certain measurement accuracies and/or an estimated accuracy when measuring for a certain time may be presented to an operator. Furthermore, a price for buying or renting a certain software programme or a software package may be monitored. This broadens the information basis for a user in advance of a measurement.

Especially in combination with the last mentioned embodiment, it is preferred that, after selection, by the operator, of a feature to be measured, effected by the optimization algorithm a set of features is presented to the operator, comprising at least one of an input option for the operator for selection of a requested accuracy level, and an input option for the operator for selection of a feature software package.

This provides the operator with more flexibility for the choice of the definitive way how a measurement is executed, wherein he is supported by the proposals provided by means of the optimization algorithm.

BRIEF DESCRIPTION OF THE DRAWINGS

In the following, the invention will be described in detail by referring to exemplary embodiments that are accompanied by figures, in which.

DETAILED DESCRIPTION

Figure 1:
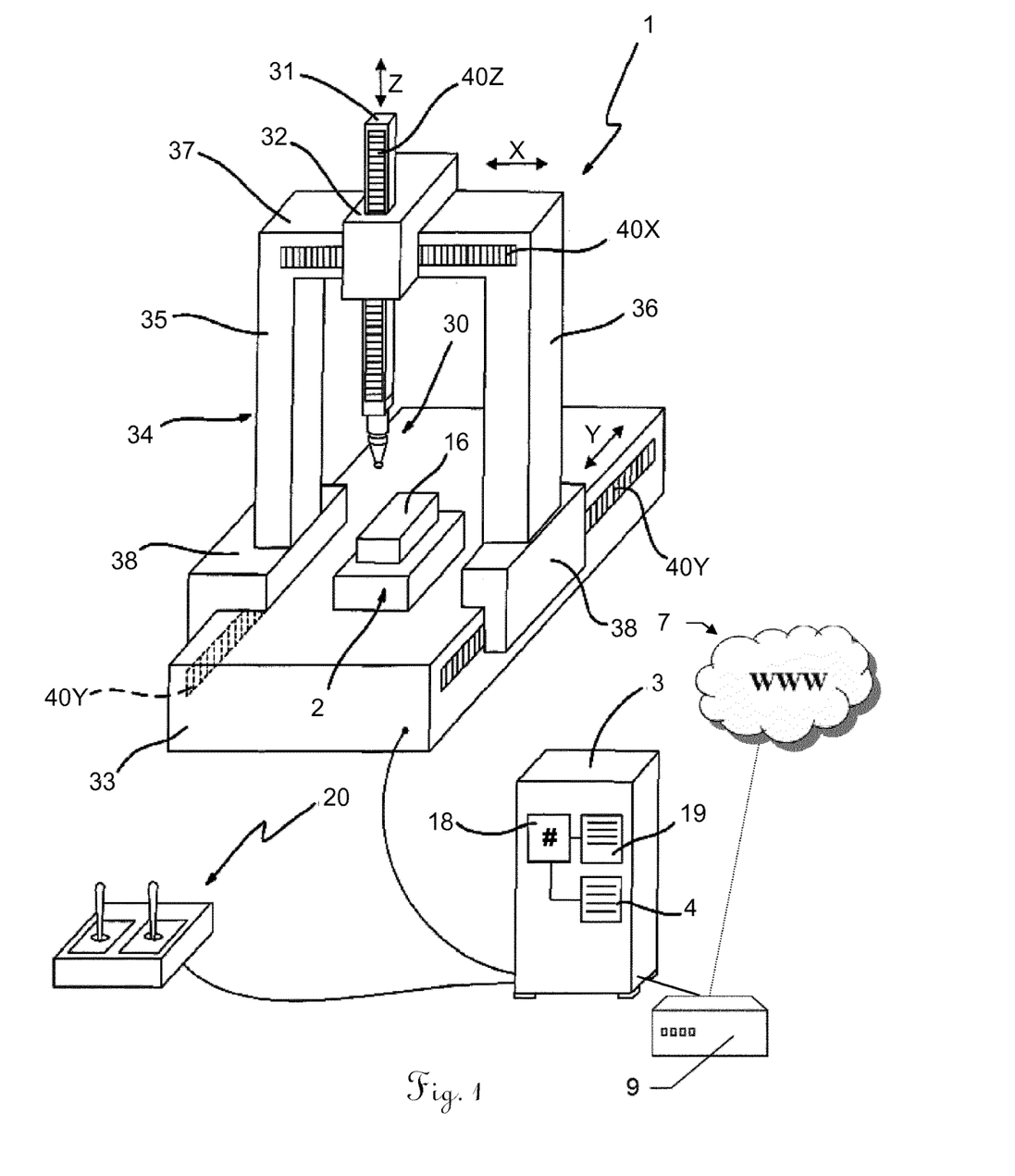
FIG. 1 shows a first embodiment of a coordinate measuring machine (CMM) as an example of a measuring machine according to the invention.

In FIG. 1, as a first exemplary embodiment of a measuring machine according to the invention, a portal type coordinate measuring machine (CMM) 1 is depicted. The CMM 1 comprises a frame structure for linking a probe head 30 to a base 33, the frame structure comprising several frame components being movable with respect to one another.

In detail, the coordinate measuring machine 1 comprises the base 33, on which a portal 34 (as one of the frame components)—being supported by bearings—is arranged so that it can be moved in a longitudinal direction (Y-direction). The portal 34 has two portal legs 35, 36 that are connected by a bridge 37 (as further frame component) at their upper ends.

An X-carriage 32, which can be driven along the bridge 37, i.e. in a space direction connecting the two portal legs 35, (X-direction), is placed on the bridge 37. A ram or Z-column 31 can be shifted in a third space direction (Z-direction). Therefore, the Z-column 31 is supported for movement in the Z-direction by bearings which are integral with the X-carriage 32. The three space directions X, Y and Z are preferably orthogonal to one another, although this is not necessary for the present invention.

The components of the frame structure of the CMM 1 may be made of aluminium, granite, ceramics or steel/iron and have wall-thickness and stiffness adapted to the load.

The CMM 1 is built for the determination of three-dimensional coordinates of measurement points on an object 2 to be measured (respectively on a certain feature 16 of the object 2) and, therefore, comprises three linear drive mechanisms for provision of movability of the probe head 30 relative to the base 33 in the first, second and third direction (X, Y and Z direction).

Each linear drive mechanism has a linear guide, one in the first, one in the second and one in the third direction (X, Y and Z direction), respectively. In a simple embodiment, the linear guide of the Y-direction drive mechanism is formed by two edge-building surfaces of the base 33, the linear guide of the X-direction drive mechanism is formed by two or three surfaces of the bridge 37, and the linear guide of the Z-direction drive mechanism is formed by a cubical hole in the X-carriage member.

Furthermore, each linear drive mechanism comprises a movable member being supported for movement along the guide by bearings. In particular, the movable member of the X-direction drive mechanism is embodied as Y-carriage 38 having mutually facing surfaces with respect to the above mentioned two guiding surfaces of the base 33. The movable member of the X-direction drive mechanism is embodied as X-carriage 32 having mutually facing surfaces with respect to the above mentioned two or three guiding surfaces of the bridge 37. And, the movable member of the Z-direction drive mechanism is formed by Z-column 31 having mutually facing surfaces with respect to the inner surfaces of the cubical hole in the X-carriage 32.

Moreover, each linear drive mechanism comprises a linear measuring instrument for determination of a first, a second or a third drive position, respectively, of each movable member in the first, the second or the third direction (X, Y and Z direction), respectively.

A probe head 30, on which a stylus is arranged exemplarily, is fastened on the lower free end of the Z-column 31. The stylus is used in a manner known per se for touching the object 2 to be measured. However, the present invention is not restricted to a tactile coordinate measuring machine and may likewise be used for coordinate measuring machines in which a measurement point is approached in a non-contact manner, i.e. for example a coordinate measuring machine with an optical scanning head. More generally, the probe head 30 may be designed for arranging a contact probe, e.g. a scanning or touch trigger probe, or a non-contact probe, particularly an optical, capacitance or inductance probe.

Furthermore, the invention is not restricted to a coordinate measuring machine in the portal bridge design as shown here. It may equally be used for coordinate measuring machines in gantry design, in which only the bridge 37 with two supports, functioning as very short feet, can travel along two highly placed fixed rails. Moreover, the invention may generally be used for all types of coordinate measuring machines, i.e. for a CMM being designed as parallel-kinematics machine as well as for a CMM having linear or serial kinematics. Exemplarily, the CMM may be designed in bridge-type, L-bridge-type, horizontal-arm-type, cantilever-type or gantry-type.

In this exemplary embodiment of FIG. 1, the portal legs 35, 36 each have a movable Y-carriage 38 which allow movement of the portal 34—including the bridge 37—in the Y-direction.

A measuring scale 40Y being part of the Y-measuring instrument is schematically represented on the long side of the base 33, wherein the scale 40Y extends parallel to the Y-direction. The scale may be a glass measuring scale, e.g. having incremental or absolute coding, with which a drive position in the Y-direction of the Y-carriage 38 can be determined. It is to be understood that the measuring instrument may furthermore contain suitable sensors for reading the measuring scale 40Y, although for the sake of simplicity these are not represented here. However, it should be pointed out that the invention is not restricted to the use of glass measuring scales, and therefore may also be used with other measuring instruments for recording the drive/travelling-positions of the movable members of the drive mechanisms.

Another measuring scale 40X is arranged parallel to the X-direction on the bridge 37. Finally, another measuring scale 40Z is also arranged parallel to the Z-direction on the Z-ram 31. By means of the measuring scales 40X, 40Z as part of the linear measuring instruments, it is possible to record the present drive positions of the X-carriage 32 in X-direction and of the Z-column 31 in the Z-direction metrologically in a manner which is known per se.

In the shown embodiment, the base 33 comprises a table for supporting an object 2 to be measured, on which the space coordinates and dimensions of a feature 16 are intended to be determined.

Also shown is a local computer terminal 3, as a control and calculation unit, which is, according to this example, designed to actuate the motor drives of the CMM 1 so that the probe head 30 travels to a measurement point of the feature 16. For manual operation, the control unit 3 may be connected to a user console 20. The control unit 3 may also be designed to effect fully automatic approach of the probe head 30 to the object 2 and measurement of features 16 of the object 2.

The control and calculation unit 3 comprises a processor 18 and a plurality of memories 4, 19. In particular, the control and calculation unit 3 is designed for determining three space-coordinates of measurement points on a feature 16 of the object 2 as a function of at least the first, the second and the third drive position of the three drive mechanisms.

According to one embodiment of the invention, a memory unit assigned to the measuring machine 1 is installed at the site of the local computer terminal 3, for example as part of the memories 4, 19. In the memory unit may be stored a data base comprising CAD data of objects 2 to be measured, including sizes/typical dimensions and tolerances of features 16 of an object 2, as well as measuring parameters of the measuring machine 1.

According to a further embodiment of the invention, an assigned set of measurement software programmes for controlling the measuring machine 1 is installed at the site of the local computer terminal 3, for example on a local hard disk. The assigned set of measurement software programmes comprises an optimization algorithm which is designed to automatically select, dependent on the stored typical dimensions and tolerances of the features 16 to be measured, measuring parameters of the measuring machine 1 and/or a measurement software programme from the set of measurement software programmes.

In the shown embodiment, the local computer terminal is connected with the internet 7 by a modem 9.

Figure 2:
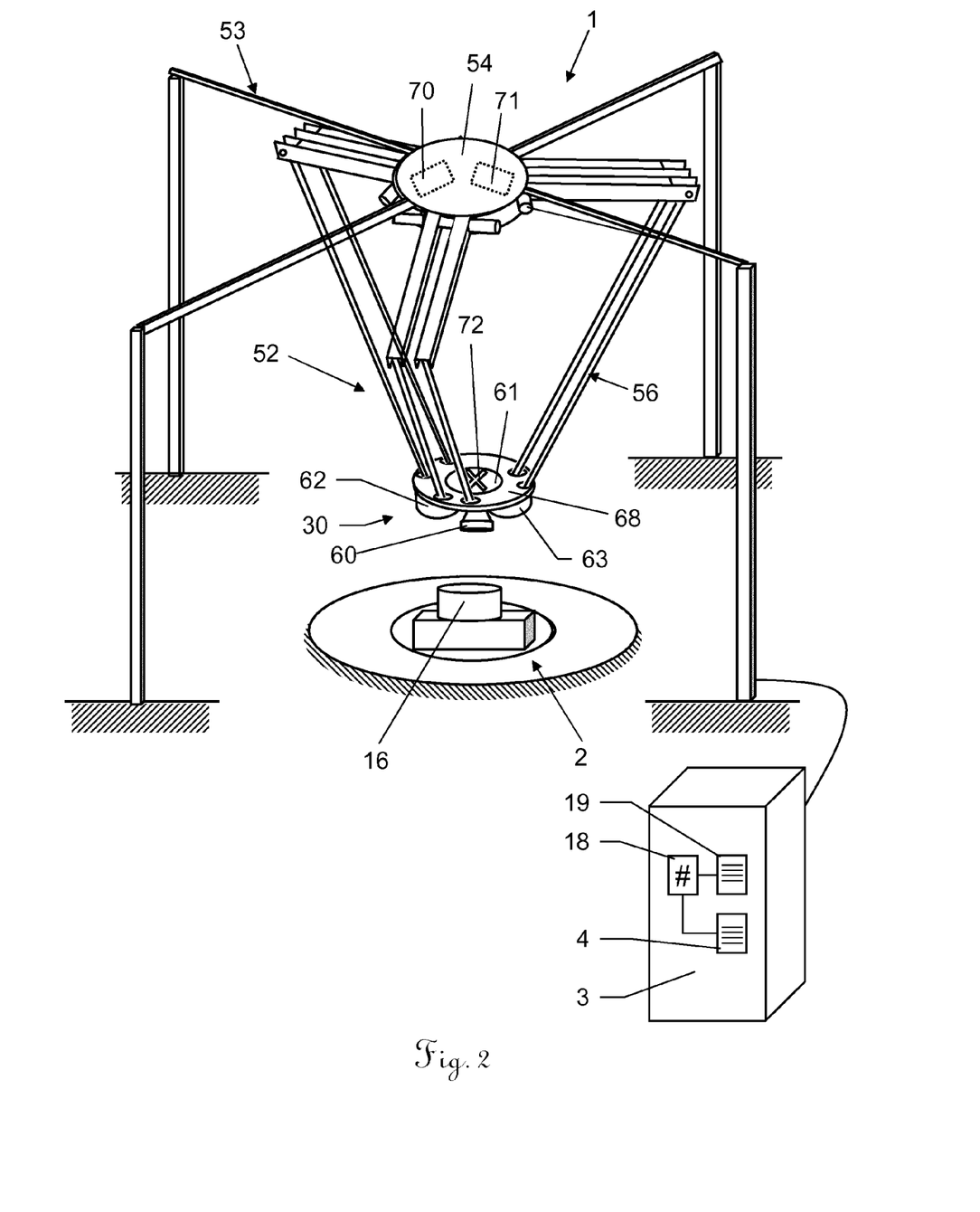
FIG. 2 shows a second embodiment of a CMM as an example of a measuring machine according to the invention.

In FIG. 2, as a second exemplary embodiment of a measuring machine according to the invention, a parallel kinematics CMM 1 is depicted having a Delta Robot 52 as a supporting structure.

The Delta Robot 52 comprises a stationary frame 53 supporting a stationary base 54, and three arms 56, also called kinematic chains. The frame 53 is usually a massive construction, but presented here only schematic in order to show details of the Delta Robot 52 more clearly. Each arm has two parts, which are linked by a middle joint. The first part of each arm 16 is connected by first joints to the stationary base 54 and with their second parts by second joints to an end effector 68. The end effector in this case is built in form of a circle like plate supporting a measurement probe head 30, here in form of a camera 60 accommodated in a tool-holder 61, a distance measurement unit 62 and a light source 63 for illuminating a target object 2 with at least one feature 16, which can be placed at a workspace beneath the end effector 68. The tool-holder is configured in a way that the tool or measurement probes are interchangeable. Furthermore, the end effector 68 supports a sensor unit 71 comprising a multi acceleration sensor measuring the acceleration/deceleration actions in horizontal x- and y-directions and in vertical z-direction. Optionally an IMU can be included in the sensor unit.

In this embodiment a control unit 70 and an analysing unit 71 are arranged in the stationary base 54 of the Delta Robot 52. However, the analysing unit 71 can be located externally in a computer as well, which can be connected to the Delta Robot 52 by wired or wireless communication means (not shown). As usual, the joints are provided with angle encoders (not shown) in order to deliver according angle signals, so that the current position of the end effector 68 with the camera 60 can be derived and used by the analysing unit 71 and the control unit 70. The control unit 70 controls the movement of the end effector 68 with the camera 60 within the motion zone having three degrees of freedom (lateral in x-, y-, z-directions) by means of actuators (not shown) in a known manner by using the signals/data delivered by the angle encoders and in this example by additionally using the signal/data delivered by the multi acceleration sensor. Using the signals of the multi acceleration sensor allows determining the current position of the camera more precisely.

As disclosed in the European patent application with the application number EP 12183806.4, the position of the end effector 68 with the measurement probe can also be determined by means of at least one camera (not shown).

Of course the CMM 1 can be, as known in the state of the art, provided with input means (not shown) and with output means (not shown), e.g. in form of a display or monitor and optionally a loud speaker for acoustic warning connected to the analysing unit 71 for presenting the results to the user. Further as known there is an input means for enabling the user to manipulate the CMM 1. Those means can be integrated in the CMM 1, e.g. in the stationary base 54 or they can be built as an external unit (not shown) or integrated in a computer (not shown) and connected to the CMM 1 by wire or wireless in well known manner.

Also shown is a local computer terminal 3, as a control and calculation unit, which is, according to this example, designed to actuate the motor drives of the coordinate measuring machine 1 so that the probe head 30 travels to a measurement point of the feature 16. For manual operation, the control unit 3 may be connected to a user console (not shown). The control unit 3 may also be designed to effect fully automatic approach of the probe head 30 to the object 2 and measurement of features 16 of the object 2.

The control and calculation unit 3 comprises a processor 18 and a plurality of memories 4, 19. In particular, the control and calculation unit 3 is designed for determining three space-coordinates of measurement points on a feature 16 of the object 2 as a function of at least the first, the second and the third drive position of the three drive mechanisms.

According to one embodiment of the invention, a memory unit assigned to the measuring machine 1 is installed at the site of the local computer terminal 3, for example as part of the memories 4, 19. In the memory unit may be stored a data base comprising CAD data of objects 2 to be measured, including sizes/typical dimensions and tolerances of features 16 of an object 2, as well as measuring parameters of the measuring machine 1.

According to a further embodiment of the invention, an assigned set of measurement software programmes for controlling the measuring machine 1 is installed at the site of the local computer terminal 3, for example on a local hard disk. The assigned set of measurement software programmes comprises an optimization algorithm which is designed to automatically select, dependent on the stored typical dimensions and tolerances of the features 16 to be measured, measuring parameters of the measuring machine 1 and/or a measurement software programme from the set of measurement software programmes.

Because the design of measuring machines of the generic kind as well as the design of different linear guides and different measuring instruments are well known to skilled persons, it must be understood that numerous modifications and combinations of different features can be made. For instance, the measuring machine can also be an articulated arm type CMM. All of these modifications lie within the scope of the invention.

Figure 3:
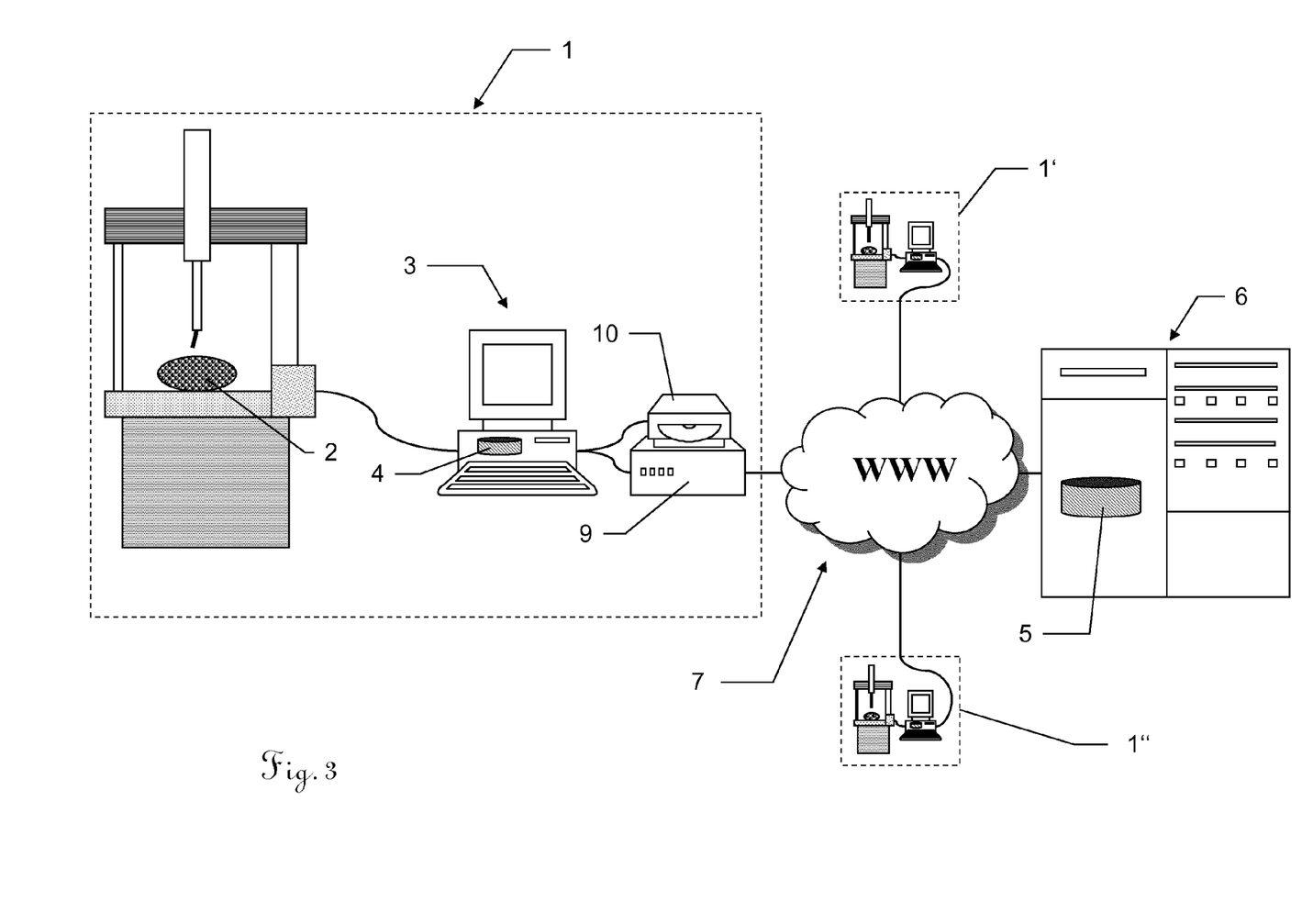
FIG. 3 shows an illustration of possible embodiments of the control structure for the measuring machine of FIG. 1, from a local computer terminal and/or from external central computers.

The various embodiments of the control structure for the measuring machine 1, from the local computer terminal 3 or from external central computers, are further illustrated in FIG. 3.

FIG. 3 shows, in a simplified form, a CMM 1 largely similar to the one of FIG. 1 with an object to be measured 2 and a local computer terminal 3 that is connected to the CMM 1. The local computer terminal 3, as a control and calculation unit 3, comprises a processor and a memory 4. In particular, the control and calculation unit 3 is designed for determining three-space coordinates of measurement points of a feature of the object 2. The local computer terminal 3 is provided with a disk drive or additional memory 10, which is arranged externally in this embodiment, and connected to the internet 7 by a modem 9.

A central computer or server 6, comprising memory 5, is connected to the internet 7.

According to one embodiment of the invention, the memory unit assigned to the measuring machine 1 is installed on the central computer 6 of a network and/or internet 7 server and made accessible to the local computer terminal 3 over a local network connection and/or the internet connection (modem) 9.

According to a further embodiment, the set of measurement software programmes for controlling the measuring machine 1 and assigned to the measuring machine 1 is installed on the central computer 6 of a network and/or internet 7 server and made accessible to the local computer terminal 3 over a local network connection and/or the internet connection (modem) 9.

According to the shown example, the set of measurement software programmes is additionally made available to further measuring machines 1', 1" via the internet 7.

The memory unit and the set of measurement software programmes may be completely or partially be stored and executed on the local computer terminal 3 or the central computer 6.

Figure 4:
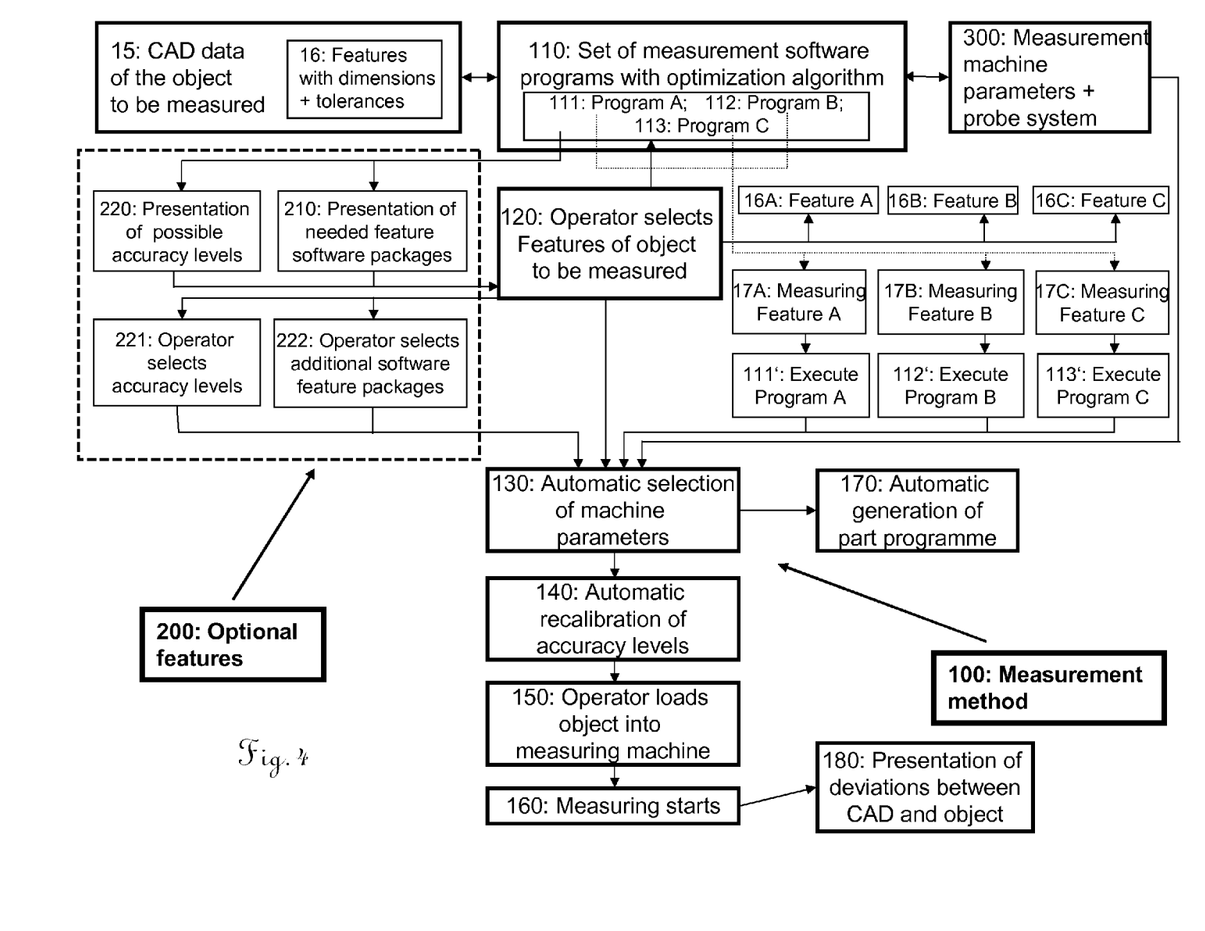
FIG. 4 shows an illustration of the method according to the invention for automated measurement of an object with a measuring machine as illustrated in FIG. 1, FIG. 2 and FIG. 3.

FIG. 4 illustrates the method according to the invention for automated measurement of an object with a measuring machine, particularly a coordinate measuring machine, as described with reference to FIGS. 1, 2 and 3.

It is presupposed that CAD data 15 of the object to be measured are available and comprise typical dimensions/sizes and tolerances of one or more features 16. These data are typically stored in a data base as a part of a memory unit assigned to the measuring machine and stored at the site of local computer as a control and evaluation unit of the measuring machine or on a central computer of a network and/or an internet server, which is accessible from the local computer terminal over a local network connection and/or an interconnection, respectively.

In a further data base, also located (at least partially) locally or (at least partially) externally or both, are stored probe systems and measuring machine parameters 300.

As a further prerequisite for execution of the method according to the invention, a set 110 of measurement software programmes, comprising an optimization algorithm, is provided, the set 110 comprising, for example, a programme (A) 111 dedicated for a feature 16A, a programme (B) 122 dedicated for a feature 16B, and a programme (C) 113 dedicated for a feature 16C.

Under the assumption that the above preconditions are satisfied, an operator selects, in a step 120, features of the object to be measured, for example features 16A, 16B, and 16C. This selection is transferred to the set 110 of measurement software programmes, and the optimization algorithm automatically selects, in a step 130, for each feature 16A, 16B, 16C chosen by the operator, measuring parameters 17A, 17B, 17C of the measuring machine 1, and/or a related measurement programme 111, 112, 113 from the set 110 of measurement software programmes, to be executed in steps 111', 112', and/or 113', respectively. Thereby, the automatic selection particularly depends on the stored typical dimensions and tolerances of the selected features 16A, 16B, and 16C. This is accompanied by a selection of a suitable probe system.

Form tolerances will automatically lead to the selection of a certain scanning mode. Then, dependent on tolerance demands, adequate probe and accuracy files are automatically selected. Position tolerances can be measured in different ways, and a selection will depend on other selections.

The probe system is selected automatically depending on certain aspects, such as the needed accuracy, the throughput, the availability, etc. The system will automatically find out if there is a need for a datum and then select how to create it.

Step 130 is followed typically, in a step 140, by an automatic recalibration of the machine accuracy levels required for the measurements of the selected features. The method step 130 also triggers an automatic generation of part programmes, in a step 170. This accomplishes the preparation phase of the measurement.

Then, in a step 150, the operator loads the object to be measured into the measuring machine and, if necessary, a selected probe system. Then, in a step 160, the measurement is started. There will be one machine type (available in different sizes).

After accomplishment of the measurement, the measured object data, as real part measurement data, are compared with the CAD data 15, and deviations between the measured real data and the CAD data 15 are determined and presented.

The above sequence of method steps represents a first embodiment of the measurement method according to the invention.

The embodiment of the invention as illustrated in the figures and described above implies, concerning the automatic selection of a measurement software programme, that, if a programme or function is not locally available, but the programme being required for an optimum precise measurement, the system will automatically try to find the related programme or features on the web/computer/intranet and load it into the active computer memory for availability for execution.

This means that in the course of a measuring task for measuring an object (e.g. an engine block) a first feature (e.g. four cylinders) is measured with machine accuracy "A" and measuring speed "B", a second feature (e.g. twenty cooling outlets) with accuracy "C" and speed "D", and a third feature (e.g. eight thread holes) with accuracy "E" and speed "F".

Preferably, during the execution of the measuring programme the system is able to automatically switch between the different modes.

A further embodiment comprises a set 200 of optional features/additional steps insertable into, or more precisely parallel to, the flow of steps as described above, before the step 130.

According to this second embodiment of the inventive method, after the input of the feature selection by the operator to the set 110 of measurement software programmes, the optimization algorithm automatically selects and effects presentation to the operator of one more of:
210: needed feature software packages;
220: possible accuracy levels.
The operator may then select:
221: accuracy levels; and/or
222: additional software feature packages.

It should be noted that the above list of options may be supplemented by further items.

Additionally, an estimated time for measuring with certain measurement accuracies and/or an estimated accuracy when measuring for a certain time may be presented to an operator. Furthermore, a price for buying or renting a certain software programme 111, 112, 113 or a software package may be monitored. If the software is stored locally, e.g. there may be an enabling key for each programme or module, and if the software is hosted on a remote server, the "enabler" for the operator may be a business card.

After input reply in response to such a presentation of a set 200 of additional options by the operator to the set 110 of measurement software programmes, the optimization algorithm automatically then selects, in a step 130, for each feature 16A, 16B, 16C chosen by the operator, measuring parameters 17A, 17B, 17C of the measuring machine 1, and/or a related measurement programme 111, 112, 113 from the set 110 of measurement software programmes, thereby taking into account the feedback of the operator. The further sequence of method steps is then the same as described for the first embodiment of the inventive method.

Although the invention is illustrated above, partly with reference to some preferred embodiments, it has to be understood that numerous modifications and combinations of different features of the embodiments can be made. Particularly, all described embodiments can be combined if not explicitly stated otherwise. All of these modifications lie within the scope of the appended claims.

What is claimed is:

1. A measuring machine for automated measurement of an object and detection of differences between a feature of the object and CAD data of the object, the CAD data being stored in a data base, the measuring machine comprising
   a probe head and a probe system comprising a probe to be connected with the probe head and measurement functionality for determining three-dimensional coordinates of a feature of the object,
   a local computer terminal that is connected to or part of the measuring machine and connected with the internet,
   an assigned memory unit for storing the data base comprising the CAD data, and
   an assigned set of measurement software programs for controlling the measuring machine, wherein:
     the assigned set of measurement software programs for controlling the measuring machine is installed at least partially on a central computer and accessible over an internet connection,
     the stored CAD data of the object comprise typical dimensions and tolerances of the features of the object, and
     the assigned set of measurement software programs for controlling the measuring machine comprises an optimization algorithm for the measurement of each feature, the optimization algorithm being designed to select automatically, dependent on the stored typical dimensions and tolerances of the features of the object to be measured, measuring parameters of the measuring machine, and/or a measurement software program from the set of measurement software programs, wherein the optimization algorithm is adapted to effect, after selection of a feature of the object to be measured by the operator, a presentation of a set of options for the operator, the set comprising:

possible accuracy levels for the measurement of the feature, an input option for the operator for selection of an accuracy level, needed software packages comprising additional measurement software programs for measuring the feature with the selected accuracy level, the needed software packages being installed on the central computer, and an input option for the operator for selection of a needed software package to be accessed over the internet connection.

2. The measuring machine according to claim 1, wherein the measuring machine comprises a coordinate measuring machine.

3. The measuring machine according to claim 1, wherein: the probe head is supported
for movement along three mutually perpendicular axes,
for movement around a rotational axis, or
by a parallel kinematics structure.

4. The measuring machine according to claim 1, wherein: the assigned memory unit is provided at least partially
at the site of the local computer terminal,
in a private or public cloud and/or
on a central computer of a network and/or an internet server and accessible over a local network connection and/or an internet connection, respectively.

5. The measuring machine according to claim 1, wherein: the computer terminal is connected with the internet by a modem.

6. The measuring machine according to claim 1, wherein: the assigned set of measurement software programs for controlling the measuring machine is installed at least partially
at the site of the local computer terminal, and/or
in a private or public cloud.

7. A method for automated measurement of an object with a measuring machine and automated detection of deviations between a feature of the object and CAD data of the object, the CAD data being stored in a data base, the measuring machine comprising
a local computer terminal that is connected to or part of the measuring machine and connected with the internet,
an assigned memory unit for storing the data base comprising the CAD data, and
an assigned set of measurement software programs for controlling the measuring machine,
the method comprising the steps of
selecting, by an operator of the measuring machine, a feature of the object to be measured by the measuring machine,
selecting a probe system and measurement parameters of the measuring machine,
measuring the feature of the object, and
detecting deviations between the feature and the CAD data, and presenting deviations between the feature and the CAD data, wherein:
the assigned set of measurement software programs for controlling the measuring machine is installed at least partially on a central computer and accessible over an internet connection,
the stored CAD data of the object comprises typical dimensions and tolerances of the features of the object, and,
in the step of selecting a probe system and measurement parameters of the measuring machine, an optimization algorithm for the measurement of each feature automatically selects, dependent on the stored typical dimensions and tolerances of the features of the object to be measured,
measuring parameters of the measuring machine, and/or
a measurement software program from a set of measurement software programs,
wherein after selection of a feature of the object to be measured, effected by the optimization algorithm a set of options is presented to the operator, the set comprising:
possible accuracy levels for measurement of the feature,
an input option for the operator for selection of an accuracy level,
needed software packages for measuring the feature with the selected accuracy level, the needed software packages being installed on the central computer, and
an input option for the operator for selection of a software package,
wherein a selected software package is accessed over the internet connection.

8. The method according to claim 7, wherein:
the measuring machine is a coordinate measuring machine comprising
a probe head, and
a probe system comprising a probe to be connected with the probe head and measurement functionality for determining three-dimensional coordinates of a feature of the object.

9. The method according to claim 7, wherein:
the probe head is supported for movement along three mutually perpendicular axes.

10. The method according to claim 7, wherein:
features of the object having different sizes and tolerances are measured.

11. The method according to claim 7, wherein:
the set of measurement software programs comprises measurement software programs for measuring features of different sizes and tolerances, which are automatically selected and executed in the course of performing a measurement.

12. The method according to claim 7, wherein:
the assigned memory unit is installed at least partially
at the site of the local computer terminal,
in a private or public cloud and/or
on a central computer of a network and/or an internet server and accessed over a local network connection and/or an internet connection, respectively.

13. The method according to claim 7, wherein:
the assigned set of measurement software programs for controlling the measuring machine is installed at least partially at the site of the local computer terminal, and the method is executed at least partially on the local computer, and/or in a private or public cloud.

14. The method according to claim 7, wherein:

the automatic selection of the measurement software program is subject to parameters of the measuring machine, attributes of the feature of the object to be measured, and/or operator-selected parameters.

15. The method according to claim 14, wherein:

the parameters of the measuring machine include a size of the measuring machine.

16. The method according to claim 14, wherein:

the operator-selected parameters include an accuracy or tolerance level and/or a throughput or speed level of measurement to be executed.

17. A non-transitory computer program product comprising program code stored on a machine-readable medium for carrying out the method according to claim 7.

* * * * *